United States Patent
Inoue et al.

(10) Patent No.: US 12,234,761 B2
(45) Date of Patent: Feb. 25, 2025

(54) EXHAUST GAS PURIFICATION DEVICE AND ENGINE

(71) Applicant: Yanmar Holdings Co., Ltd., Osaka (JP)

(72) Inventors: Tsuyoshi Inoue, Osaka (JP); Daisuke Morimitsu, Osaka (JP); Kohei Iwamoto, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/272,988

(22) PCT Filed: Dec. 1, 2021

(86) PCT No.: PCT/JP2021/044089
§ 371 (c)(1),
(2) Date: Jul. 18, 2023

(87) PCT Pub. No.: WO2022/158130
PCT Pub. Date: Jul. 28, 2022

(65) Prior Publication Data
US 2024/0309786 A1    Sep. 19, 2024

(30) Foreign Application Priority Data
Jan. 19, 2021  (JP) ................. 2021-006377

(51) Int. Cl.
*F01N 3/20*  (2006.01)
*F02B 29/04*  (2006.01)
(Continued)

(52) U.S. Cl.
CPC ........ *F01N 3/2066* (2013.01); *F02B 29/0406* (2013.01); *F02B 37/225* (2013.01); *F02M 35/10157* (2013.01); *F01N 2610/1453* (2013.01)

(58) Field of Classification Search
CPC . F01N 3/08; F01N 3/18; F01N 3/2066; F01N 3/24; F01N 2610/1453;
(Continued)

(56) References Cited

U.S. PATENT DOCUMENTS 4,002,136 A * 1/1977 Michalak ............... F01N 13/12
                                                       440/89 R
2012/0096838 A1    4/2012 Sandberg et al.

FOREIGN PATENT DOCUMENTS

JP    09-032540 A    2/1997
JP    2007-192083 A    8/2007
(Continued)

OTHER PUBLICATIONS

Japanese Office Action issued dated Dec. 12, 2023 issued in JP2021006377.
(Continued)

*Primary Examiner* — Loren C Edwards
(74) *Attorney, Agent, or Firm* — NORTON ROSE FULBRIGHT US LLP

(57) ABSTRACT

An exhaust gas purification device for purifying exhaust gas of nitrogen oxides includes: a catalyst that is provided in an exhaust pipe (exhaust passage) for transporting exhaust gas, discharged from an engine, in a predetermined exhaust direction, and promotes the reduction of the exhaust gas; and an injection nozzle that is provided in the exhaust pipe so as to be upstream of the catalyst in the exhaust direction, and injects a reducing agent for reducing the exhaust gas. The injection nozzle includes an injection hole for injecting the reducing agent toward the catalyst, and a discharge hole for discharging a cooling medium in at least the direction opposite the exhaust direction.

17 Claims, 5 Drawing Sheets

(51) Int. Cl.
*F02B 37/22* (2006.01)
*F02M 35/10* (2006.01)
(58) Field of Classification Search
CPC .... F01N 13/08; F02B 29/0406; F02B 37/225; F02M 35/10157
See application file for complete search history.

(56) References Cited

FOREIGN PATENT DOCUMENTS

| | | | | |
|---|---|---|---|---|
| JP | 2010-090836 A | 4/2010 | | |
| JP | 2015-075042 A | 4/2015 | | |
| JP | 2015094327 A | 5/2015 | | |
| JP | 2017-015081 A | 1/2017 | | |
| JP | 2020506330 A | 2/2020 | | |
| JP | 2020045824 A | * | 3/2020 | ............... F01N 3/02 |
| WO | WO-2005073528 A1 | * | 8/2005 | ............. F01N 13/14 |

OTHER PUBLICATIONS

International Search Report dated Jan. 25, 2022 issued in corresponding PCT Application PCT/JP2021/044089.

* cited by examiner

EXHAUST GAS PURIFICATION DEVICE AND ENGINE

CROSS-REFERENCE TO RELATED APPLICATIONS

This application is a national stage application pursuant to 35 U.S.C. § 371 of International Application No. PCT/JP2021/044089, filed on Dec. 1, 2021, which claims priority under 35 U.S.C. § 119 to Japanese Patent Application No. 2021-006377 filed on Jan. 19, 2021, the disclosures of which are hereby incorporated by reference in their entireties.

TECHNICAL FIELD

The present invention relates to an exhaust gas purification device that purifies nitrogen oxides of exhaust gas and an engine including the exhaust gas purification device.

BACKGROUND ART

A marine or land engine includes an exhaust gas purification device that includes a so-called SCR system that purifies exhaust gas by reducing nitrogen oxides in the exhaust gas. The exhaust gas purification device provides a catalyst in an exhaust passage of the exhaust gas and supplies urea to the catalyst, thereby reducing nitrogen oxides accumulated in the catalyst.

For example, as disclosed in Patent Document 1, the exhaust gas purification device supplies urea water that is a reducing agent to inside of an exhaust pipe via an injection nozzle. Further, the exhaust gas purification device of Patent Document 1 adopts a so-called air-assisted urea injection system that supplies pressurized air in an air tank to an injection nozzle by using a pressurized air supply pump and promotes atomization of urea by using the pressurized air.

PRIOR ART DOCUMENT

Patent Document

Patent Document 1: JP-A-2015-75042

SUMMARY OF INVENTION

Technical Problem

In a case where the above air-assisted urea injection system (air assist function) is adopted, it is common to use an air tank storing pressurized air, that is, a pressurized air tank provided in a hull or equipment. In a case where the hull is relatively large like a large ship or a medium-sized ship, there is a margin in an installation space. Thus, the pressurized air tank can be provided. However, in a case where the hull is relatively small like a small ship, there is no margin in the installation space, and it may be difficult to provide the pressurized air tank. Therefore, the air assist function is not adopted in the small ship or the like.

Meanwhile, when the injection nozzle is arranged near a wall of the exhaust pipe in the exhaust gas purification device, the following problems may occur, for example: the reducing agent such as urea adheres to a wall surface of the exhaust passage; and the reducing agent and the exhaust gas are not appropriately mixed. In order to avoid those problems, in the exhaust gas purification device, the injection nozzle may be arranged such that an injection hole is positioned near the center of the exhaust pipe. However, thermal damage of the exhaust gas occurs in the injection nozzle near the center of the exhaust pipe. Thus, for example, durability of the injection nozzle may be reduced due to heat of the exhaust gas, and the reducing agent may adhere to the injection nozzle during injection of the reducing agent. In that case, the injection nozzle may not normally operate. For example, the reducing agent may not be normally injected from the injection nozzle, and the exhaust gas may not be normally purified.

The air-assisted urea injection system may reduce the thermal damage of the exhaust gas to the injection nozzle by cooling the injection nozzle with the pressurized air. However, in the small ship or the like that does not adopt the air-assisted urea injection system, the injection nozzle cannot be cooled. Thus, the durability of the injection nozzle may be deteriorated, or the injection nozzle may not normally operate due to adhesion of the reducing agent to the injection nozzle.

An object of the present invention is to provide an exhaust gas purification device that reduces thermal damage to an injection nozzle regardless of the presence or absence of an air assist function of reducing agent injection and also provide an engine including the exhaust gas purification device.

Solution to Problem

In order to solve the above problems, an exhaust purification device of the present invention is an exhaust purification device that purifies nitrogen oxides of exhaust gas, the exhaust gas purification device including: a catalyst that is provided in an exhaust passage that allows the exhaust gas discharged from an engine to flow in a predetermined exhaust direction and promotes reduction of the exhaust gas; and an injection nozzle that is provided in the exhaust passage upstream from the catalyst in the exhaust direction and injects a reducing agent for reducing the exhaust gas, in which the injection nozzle has an injection hole for injecting the reducing agent toward the catalyst, and a discharge hole for discharging a cooling medium at least in a direction opposite to the exhaust direction.

In the exhaust gas purification device of the present invention, the injection nozzle discharges the whole quantity of the supplied cooling medium from the discharge hole.

The exhaust gas purification device of the present invention further includes a support member provided to penetrate a wall of the exhaust passage so as to extend to inside of the exhaust passage, in which the injection nozzle is attached to an end of the support member inside the exhaust passage and injects the reducing agent from the injection hole along the exhaust direction.

The exhaust gas purification device of the present invention further includes a connection passage that branches from a supercharging passage through which boosted air boosted by a supercharger is supplied to the engine, in which the injection nozzle is connected to the supercharging passage via the connection passage and injects, as the cooling medium, the boosted air flowing through the connection passage from the supercharging passage.

In the exhaust gas purification device of the present invention, the connection passage branches from the supercharging passage downstream from an intercooler provided in the supercharging passage in an air supply direction of the boosted air in the supercharging passage.

The exhaust gas purification device of the present invention further includes an adjusting mechanism that adjusts a flow rate of the boosted air passing through the connection passage to a predetermined adjustment amount or less.

In the exhaust gas purification device of the present invention, the injection nozzle is configured such that the injection hole and the discharge hole are arranged at the same position in a radial direction of the exhaust passage.

The exhaust gas purification device of the present invention is applied to the engine installed in a hull.

In order to solve the above problems, an engine of the present invention includes any of the above exhaust gas purification devices.

Advantageous Effects of Invention

The present invention provides an exhaust gas purification device that reduces thermal damage to an injection nozzle regardless of the presence or absence of an air assist function of reducing agent injection and also provides an engine including the exhaust gas purification device.

DESCRIPTION OF EMBODIMENTS

Figure 1:
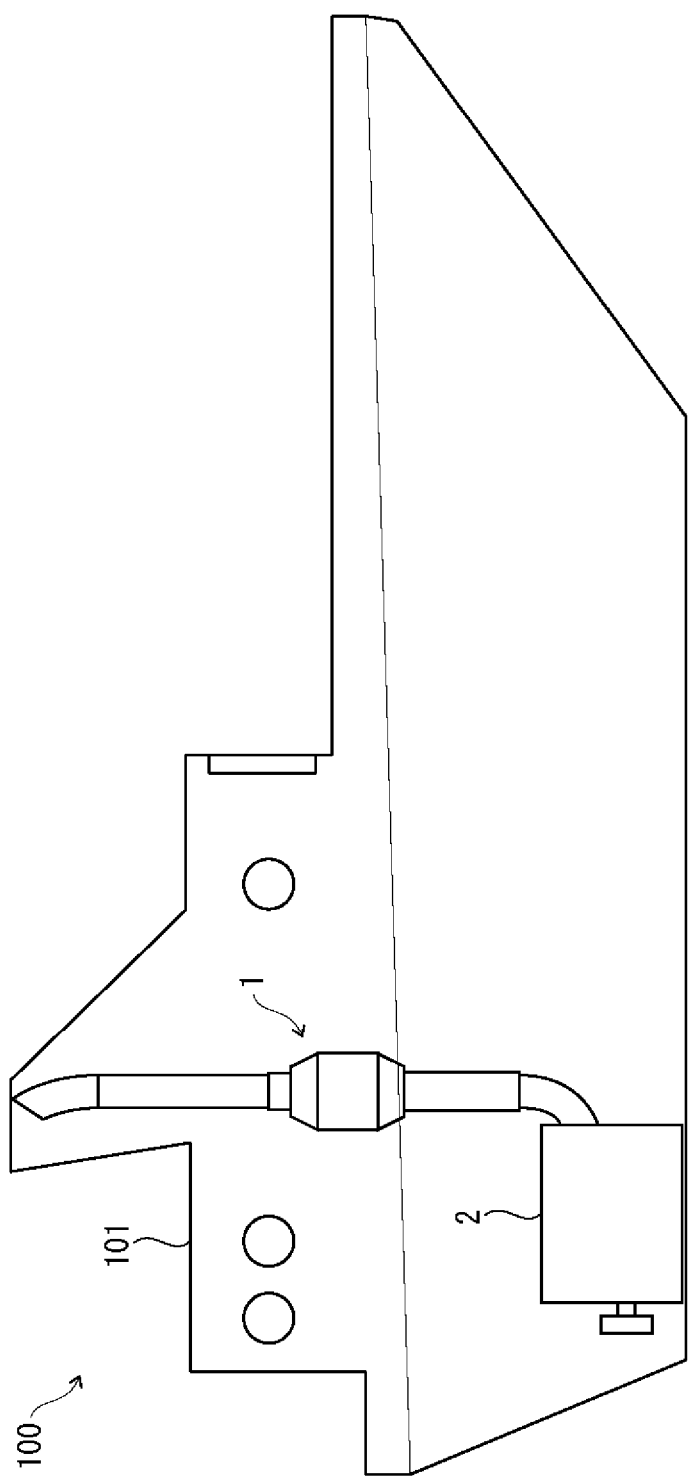
FIG. 1 is a schematic diagram illustrating an example of a ship to which an exhaust gas purification device according to an embodiment of the present invention is applied.
Figure 2:
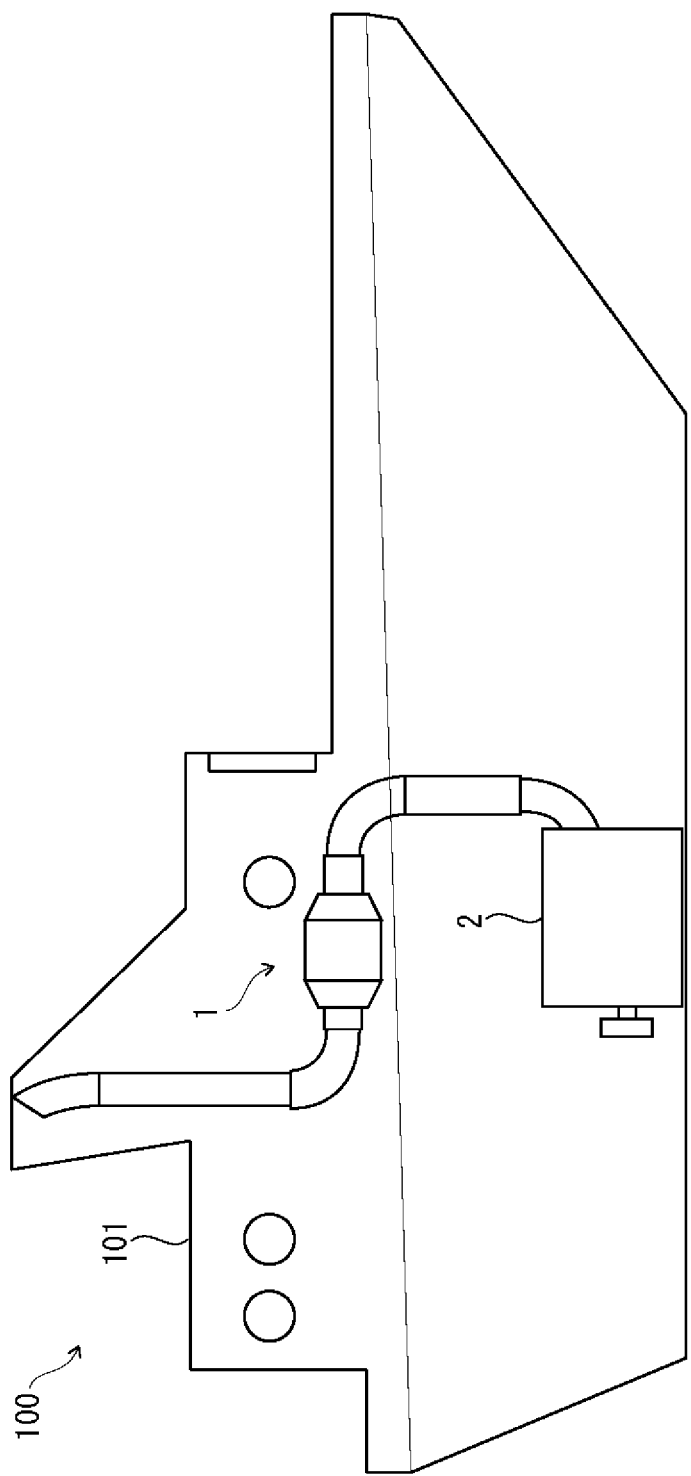
FIG. 2 is a schematic diagram illustrating an example of a ship to which an exhaust gas purification device according to an embodiment of the present invention is applied.

An exhaust gas purification device 1 according to an embodiment of the present invention will be described with reference to the drawings. As illustrated in FIGS. 1 and 2, the exhaust gas purification device 1 is applied to an engine 2 (e.g. engine 2) installed in a ship 100 (e.g. small ship) and is attached to a hull 101 (e.g. small hull 101) to purify exhaust gas discharged from the engine 2. FIG. 1 illustrates an example where the exhaust gas purification device 1 is applied to the engine 2 that discharges exhaust gas in a horizontal direction. FIG. 2 illustrates an example where the exhaust gas purification device 1 is applied to the engine 2 that discharges exhaust gas in a vertical direction.

Figure 3:
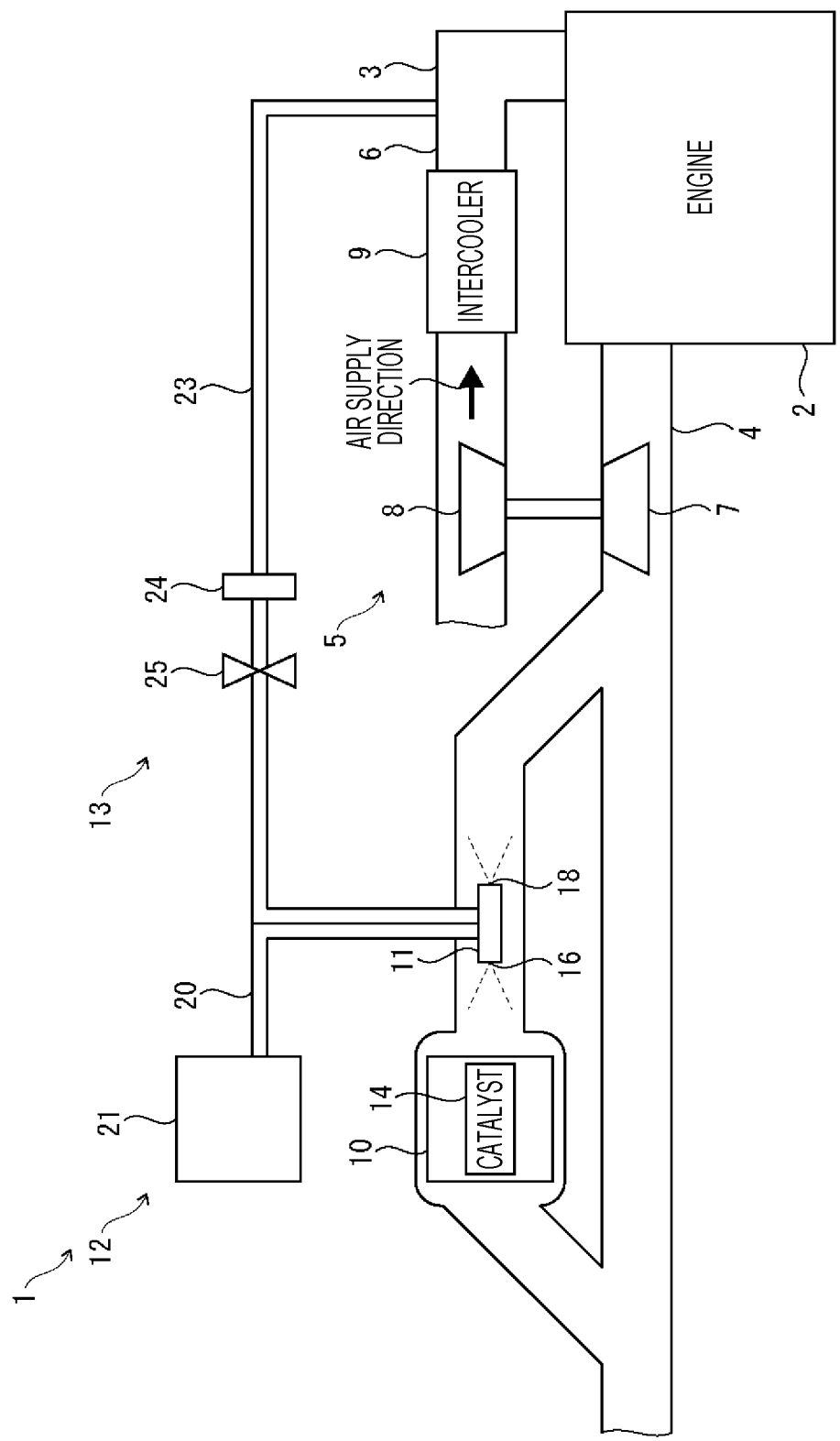
FIG. 3 is a schematic diagram illustrating an example of an exhaust gas purification device according to an embodiment of the present invention.
Figure 4:
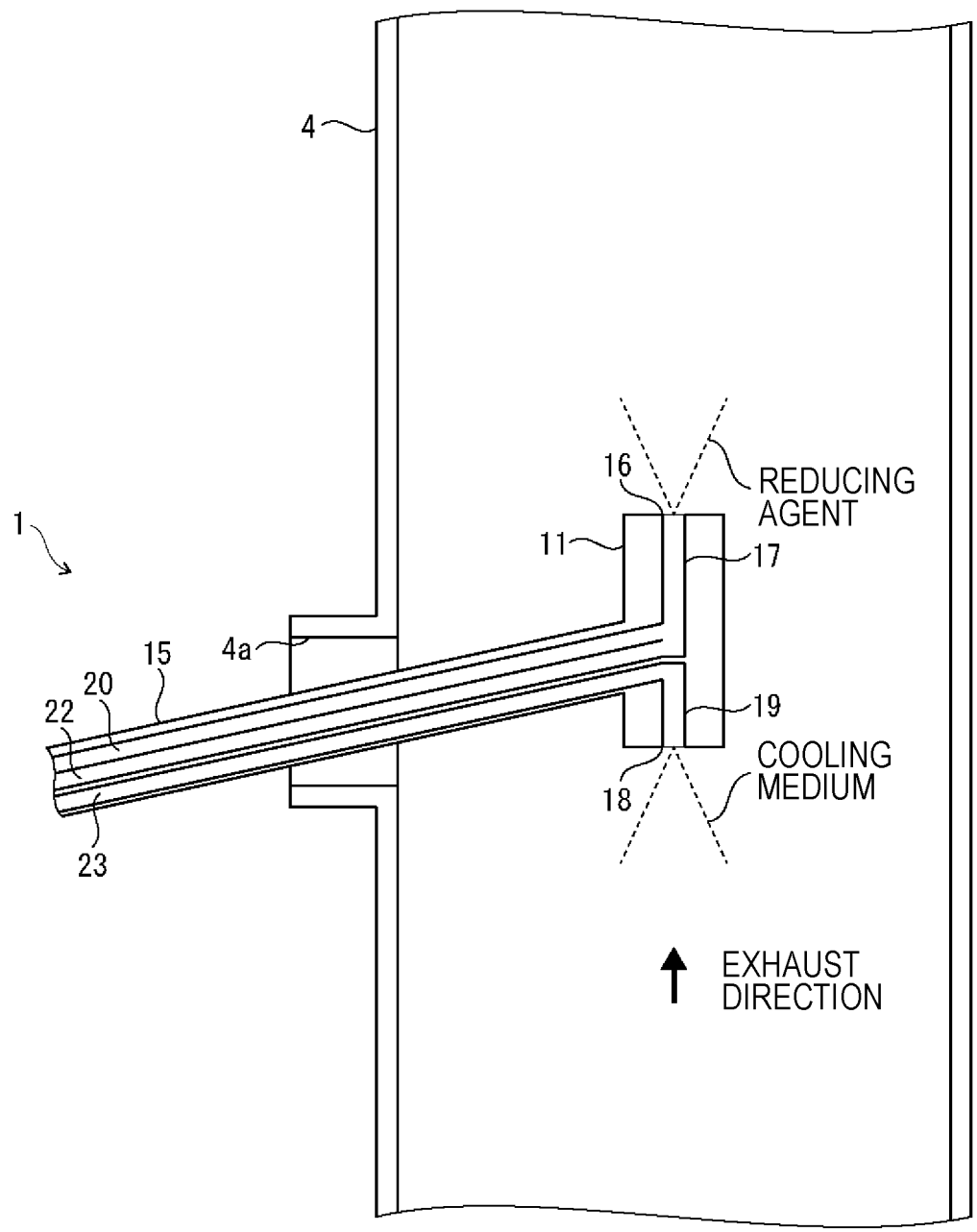
FIG. 4 is a schematic diagram illustrating an example of an injection nozzle in an exhaust gas purification device according to an embodiment of the present invention.

The engine 2 includes a plurality of cylinders including a cylinder head and a cylinder block. As illustrated in FIG. 3, the engine 2 is connected to an intake pipe 3 forming an intake passage for sucking air and an exhaust pipe 4 forming an exhaust passage for discharging exhaust gas in a predetermined exhaust direction. The intake pipe 3 is connected to a supercharger 5, and the engine 2 sucks, via the intake pipe 3, boosted air boosted by the supercharger 5. The exhaust gas purification device 1 is provided on the exhaust pipe 4, and the engine 2 purifies exhaust gas discharged via the exhaust pipe 4 by using the exhaust gas purification device 1.

The supercharger 5 has, for example, an exhaust supercharging system and includes a supercharging pipe 6 forming a supercharging passage, a turbine 7, a compressor 8, and an intercooler 9 as illustrated in FIG. 3.

The supercharging pipe 6 is connected to the intake pipe 3 of the engine 2 and supplies boosted air to the intake pipe 3. The turbine 7 is provided in the exhaust pipe 4 of the engine 2, rotates by using a flow of the exhaust gas flowing through the exhaust pipe 4, and inputs rotational driving force thereof to the compressor 8. The compressor 8 is provided in the supercharging pipe 6 on the upstream side in an air supply direction of the boosted air, assuming that the intake pipe 3 side of the supercharging pipe 6 is defined as the downstream side. The compressor 8 is driven by the rotational driving force input from the turbine 7 to boost air in the supercharging pipe 6. The intercooler 9 is provided in the supercharging pipe 6 downstream from the compressor 8 in the air supply direction of the boosted air in the supercharging pipe 6 and cools the boosted air to be supplied to the downstream side of the intercooler 9.

For example, the engine 2 is connected to a generator (not illustrated), and the generator is driven by power of the engine 2 to generate power. The engine 2 adjusts intake of the boosted air from the supercharger 5 in accordance with a load of the generator, and the pressure of the boosted air increases as the load of the generator increases. In a case where the ship 100 provided with the engine 2 for marine propulsion moves forward, the load of the engine 2 increases to increase the pressure of the boosted air in the supercharger 5. In a case where the ship 100 is stopped (in an idling state), the load of the engine 2 is low, and thus the pressure of the boosted air in the supercharger 5 decreases.

The exhaust gas purification device 1 includes a so-called selective catalytic reduction (SCR) system that purifies exhaust gas by reducing nitrogen oxides (NOx) in the exhaust gas. The exhaust gas purification device 1 is provided on the exhaust pipe 4 and is arranged downstream from the turbine 7 of the supercharger 5 in the exhaust direction of the exhaust gas. The exhaust pipe 4 may be divided into two passages, i.e., a passage for discharging the exhaust gas via the exhaust gas purification device 1 and a passage for discharging the exhaust gas not via the exhaust gas purification device 1.

For example, as illustrated in FIG. 3, the exhaust gas purification device 1 includes a catalyst reactor 10, an injection nozzle 11, a reducing agent supply mechanism 12, and a cooling medium supply mechanism 13.

The catalyst reactor 10 is provided in the exhaust pipe 4 of the engine 2 and includes a catalyst 14 such as a NOx reduction catalyst. The catalyst 14 promotes reduction in which nitrogen oxides contained in the exhaust gas flowing through the exhaust pipe 4 are selectively reduced to nitrogen and water by using urea water or the like injected by the injection nozzle 11 as a reducing agent, thereby purifying the exhaust gas.

The injection nozzle 11 is provided in the exhaust pipe 4 of the engine 2 upstream from the catalyst reactor 10 and downstream from the supercharger 5 in the exhaust direction of the exhaust gas. The injection nozzle 11 injects the reducing agent such as urea water toward the catalyst 14 of the catalyst reactor 10.

The injection nozzle 11 is arranged in the exhaust pipe 4 inside an inner wall surface of the exhaust pipe 4 and is preferably arranged near the radial center of the exhaust pipe 4. For example, the injection nozzle 11 is arranged inside the exhaust pipe 4 by being supported by a support member 15 provided to penetrate a wall of the exhaust pipe 4 so as to extend to the inside of the exhaust pipe 4. The support member 15 is inserted into a through hole 4a provided in the wall of the exhaust pipe 4. When an end of the support member 15 is arranged near the radial center of the exhaust pipe 4, the injection nozzle 11 attached to the end of the support member 15 is arranged near the radial center of the exhaust pipe 4. In a case where only one injection nozzle 11 is arranged in the exhaust pipe 4, the injection nozzle 11 may be arranged at the radial center of the exhaust pipe 4 so as to uniformly inject the reducing agent into the exhaust pipe 4.

The support member 15 extends to intersect with the exhaust direction of the exhaust gas and is preferably inclined toward the exhaust direction. In this case, the through hole 4a is formed to have an inner diameter larger than an outer diameter of the support member 15. By inclining the support member 15, the exhaust gas can easily pass through the injection nozzle 11 and the support member 15. This makes it possible to decrease a phenomenon in which air bubbles are stayed in the injection nozzle 11 and the support member 15.

The injection nozzle 11 includes an injection hole 16, a reducing agent passage 17, a discharge hole 18, and a cooling medium passage 19. The injection hole 16 injects the reducing agent along the exhaust direction and is provided, for example, on a surface of the injection nozzle 11 along the exhaust direction.

The reducing agent passage 17 is provided inside the injection nozzle 11 and is connected to the reducing agent supply mechanism 12 to allow the reducing agent supplied from the reducing agent supply mechanism 12 to flow toward the injection hole 16.

The discharge hole 18 discharges a cooling medium at least in a direction opposite to the exhaust direction and is provided, for example, on a surface of the injection nozzle 11 along the direction opposite to the exhaust direction. The surface of the injection nozzle 11 along the direction opposite to the exhaust direction may be formed in a planar shape, and the discharge hole 18 may be opened in the planar surface. The injection nozzle 11 may be configured such that the injection hole 16 and the discharge hole 18 are arranged at the same position in the radial direction of the exhaust pipe 4. For example, the discharge hole 18 discharges the cooling medium by atomizing the cooling medium in a conical shape corresponding to an outer diameter of the injection nozzle 11 so as to cover the injection nozzle 11, in particular, the injection hole 16 with the cooling medium like an air curtain.

The cooling medium passage 19 is provided inside the injection nozzle 11 and is connected to the cooling medium supply mechanism 13 to allow the cooling medium supplied from the cooling medium supply mechanism 13 to flow toward the discharge hole 18. The injection nozzle 11 discharges the whole quantity of the cooling medium supplied by the cooling medium supply mechanism 13 from the cooling medium passage 19 and the discharge hole 18. The cooling medium passage 19 may be formed in the injection nozzle 11 so as to surround the reducing agent passage 17. For example, the cooling medium passage 19 includes one tube surrounding an outer periphery of the reducing agent passage 17 or includes a plurality of tubes arranged at intervals along the outer periphery of the reducing agent passage 17.

The reducing agent supply mechanism 12 includes a reducing agent supply pipe 20 forming a reducing agent supply passage that allows the reducing agent such as urea water to flow toward the injection nozzle 11. The reducing agent supply passage of the reducing agent supply pipe 20 is connected to the reducing agent passage 17 of the injection nozzle 11. The reducing agent supply pipe 20 may be provided in the support member 15 or may be provided separately from the support member 15. For example, the reducing agent supply mechanism 12 supplies the reducing agent to the injection nozzle 11 via the reducing agent supply pipe 20 by using a predetermined supply unit 21. The supply unit 21 may supply the reducing agent stored in a tank (not illustrated) by using a pump (not illustrated), for example.

The reducing agent supply mechanism 12 supplies the reducing agent via the reducing agent supply pipe 20 at a certain pressure, for example, at 0.75 MPa and includes a reducing agent return pipe 22 forming a reducing agent return passage that returns the reducing agent that has not been injected by the injection nozzle 11. The reducing agent return passage of the reducing agent return pipe 22 is connected to the reducing agent passage 17 of the injection nozzle 11. The reducing agent return pipe 22 may be provided in the support member 15 or may be provided separately from the support member 15. The reducing agent supply mechanism 12 includes a flow control valve (not illustrated) which adjusts a return flow rate of the reducing agent flowing through the reducing agent return pipe 22 and can increase an injection amount of the injection nozzle 11 by narrowing a flow path of the reducing agent return pipe 22.

The cooling medium supply mechanism 13 uses the boosted air flowing through the supercharging pipe 6 of the supercharger 5 as the cooling medium and includes a connection pipe 23 forming a connection passage that branches from the supercharging passage of the supercharging pipe 6. The connection pipe 23 branches from the supercharging pipe 6 downstream from the intercooler 9 in the air supply direction of the boosted air in the supercharging pipe 6, takes in the boosted air cooled by the intercooler 9 from the supercharging pipe 6, and allows the cooling medium containing the boosted air to flow toward the injection nozzle 11. The connection passage of the connection pipe 23 is connected to the cooling medium passage 19 of the injection nozzle 11. The connection pipe 23 may be provided in the support member 15 or may be provided separately from the support member 15.

The cooling medium supply mechanism 13 includes a filter 24 that captures unnecessary substances from the boosted air flowing through the connection pipe 23 and a pressure regulating valve 25 serving as an adjusting mechanism that adjusts the pressure (flow pressure) of the boosted air flowing through the connection pipe 23. The pressure regulating valve 25 reduces the pressure of the boosted air to be supplied to the injection nozzle 11 through the connection pipe 23, thereby adjusting the flow rate of the boosted air only for cooling the injection nozzle 11 to a predetermined adjustment amount or less.

The cooling medium supply mechanism 13 supplies the boosted air to the injection nozzle 11 as the cooling medium while the supercharger 5 is supplying the boosted air to the engine 2. Even in a case where the pressure of the boosted air supplied from the supercharger 5 to the engine 2 changes, the cooling medium supply mechanism 13 supplies the boosted air having a certain pressure to the injection nozzle 11 by using the pressure regulating valve 25. Meanwhile, in a case where the boosted air is not supplied from the supercharger 5 to the engine 2, the cooling medium supply mechanism 13 does not supply the boosted air to the injection nozzle 11.

As described above, according to the present invention, the exhaust gas purification device 1 that purifies nitrogen oxides of exhaust gas includes: the catalyst 14 that is provided in the exhaust pipe 4 (exhaust passage) which allows the exhaust gas discharged from the engine 2 to flow in the predetermined exhaust direction and promotes reduction of the exhaust gas; and the injection nozzle 11 that is provided in the exhaust pipe 4 upstream from the catalyst 14 in the exhaust direction and injects a reducing agent for reducing the exhaust gas. The injection nozzle 11 has the injection hole 16 for injecting the reducing agent toward the catalyst 14 and the discharge hole 18 for discharging the cooling medium at least in the direction opposite to the exhaust direction.

Thus, according to the exhaust gas purification device 1 of the present invention, when the cooling medium is discharged from the injection nozzle 11 in the direction opposite to the exhaust direction, the discharged cooling medium acts on the injection nozzle 11 as an air curtain for the exhaust gas. This makes it possible to protect the injection nozzle 11 from thermal damage caused by the exhaust gas. Therefore, it is possible to restrain a decrease in durability of the injection nozzle 11 due to the thermal damage and also decrease adhesion of the reducing agent to the injection nozzle 11 due to the thermal damage, without having an air assist function of reducing agent injection. Accordingly, the injection nozzle 11 can normally operate. For example, the reducing agent can be normally injected from the injection nozzle 11, and the exhaust gas can be normally purified.

In the exhaust gas purification device 1 of the present invention, the injection nozzle 11 discharges the whole quantity of the cooling medium supplied to the injection nozzle 11 from the discharge hole 18. Therefore, because the cooling medium is supplied to the injection nozzle 11 as a medium only for cooling the injection nozzle 11, the air curtain effect by the cooling medium can be obtained more suitably by discharging the whole quantity of the cooling medium in the direction opposite to the exhaust direction. This makes it possible to cool the injection nozzle 11 more suitably to protect the injection nozzle 11 from the thermal damage of the exhaust gas.

The exhaust gas purification device 1 of the present invention further includes the support member 15 provided to penetrate the wall of the exhaust pipe 4 so as to extend to the inside of the exhaust pipe 4. The injection nozzle 11 is attached to the end of the support member 15 inside the exhaust pipe 4 and injects the reducing agent from the injection hole 16 along the exhaust direction. Therefore, when the reducing agent is injected along the exhaust direction at a position away from the inner wall of the exhaust pipe 4 toward the inside of the exhaust pipe 4, it is possible to suitably secure diffusibility of the reducing agent. This makes it possible to uniformly supply the reducing agent to the catalyst 14, thereby suitably reducing and purifying the exhaust gas.

The exhaust gas purification device 1 of the present invention further includes a connection pipe 23 (connection passage) which branches from the supercharging pipe 6 (supercharging passage) through which the boosted air boosted by the supercharger 5 is supplied to the engine 2. The injection nozzle 11 is connected to the supercharging pipe 6 via the connection pipe 23 and injects, as the cooling medium, the boosted air flowing through the connection pipe 23 from the supercharging pipe 6. Therefore, when intake air of the engine 2 to which the exhaust gas purification device 1 is applied is used as the cooling medium, it is possible to secure the cooling medium, without separately providing a device for storing the cooling medium such as an air tank or air pump. Thus, the exhaust gas purification device 1 can be applied to the small ship 100 not having the device for storing the cooling medium, that is, the exhaust gas purification device 1 can be applied to the small hull 101. This makes it possible to enhance versatility of the exhaust gas purification device 1.

In the exhaust gas purification device 1 of the present invention, the connection pipe 23 branches from the supercharging pipe 6 downstream from the intercooler 9 provided in the supercharging pipe 6 in the air supply direction of the boosted air in the supercharging pipe 6. When the boosted supply air, which is cooled by passing through the intercooler 9, is used as the cooling medium, it is possible not only to enhance the cooling effect of the injection nozzle 11 by discharging the boosted supply air, but also to enhance the cooling effect of the inside of the injection nozzle 11 when the boosted supply air passes through the injection nozzle 11.

The exhaust gas purification device 1 of the present invention further includes the pressure regulating valve 25 (adjusting mechanism) which adjusts the flow rate of the boosted air passing through the connection pipe 23 to a predetermined adjustment amount or less. In a case where the amount of the boosted air passing through the connection pipe 23 is not limited, the boosted air flows into the connection pipe 23 more than necessary, and thus the amount of the boosted air sucked into the engine 2 decreases. In this case, a temperature (exhaust temperature) of the exhaust gas discharged from the engine 2 increases to increase a risk of thermal damage to the injection nozzle 11. Meanwhile, in the present invention, the pressure regulating valve 25 is provided as the adjusting mechanism. Thus, the boosted air does not flow into the connection pipe 23 more than necessary, and the boosted air can be stably supplied to the engine 2. This makes it possible to reduce the risk of thermal damage to the injection nozzle 11.

In the exhaust gas purification device 1 of the present invention, the injection nozzle 11 is configured such that the injection hole 16 and the discharge hole 18 are arranged at the same position in the radial direction of the exhaust pipe 4. Thus, because the cooling medium is discharged directly behind injection of the reducing agent in the radial direction of the exhaust pipe 4, the discharged cooling medium can act not only on the injection nozzle 11 as an air curtain for the flow of the exhaust gas, but also on the injected reducing agent. This makes it possible to more suitably restrain precipitation of urea or the like of the reducing agent.

The exhaust gas purification device 1 of the present invention is applied to the engine 2 installed in the hull 101. This makes it possible to suitably secure the durability of the injection nozzle 11 even in the marine engine 2 operated for a long time.

In the present embodiment, an example of applying the exhaust gas purification device 1 to the small ship 100, that is, the small hull 101 has been described. However, the present invention is not limited to this example. The exhaust gas purification device 1 may be applied to a large ship or a medium-sized ship as another example.

The large ship or medium-sized ship can have the device for storing the cooling medium including an air tank or the like, and thus the exhaust gas purification device 1 may not be configured such that the cooling medium supply mechanism 13 uses the boosted air of the supercharger 5 as the cooling medium. For example, the exhaust gas purification device 1 of the large ship or medium-sized ship may be configured such that the cooling medium supply mechanism 13 uses an air supply device such as an air tank provided in the hull 101. In this case, the cooling medium supply mechanism 13 may take in supply air of the air supply device, use the supply air as the cooling medium, and supply the supply air to the injection nozzle 11. Alternatively, in the exhaust gas purification device 1, the cooling medium supply mechanism 13 may take in the cooling medium from another external device.

Figure 5:
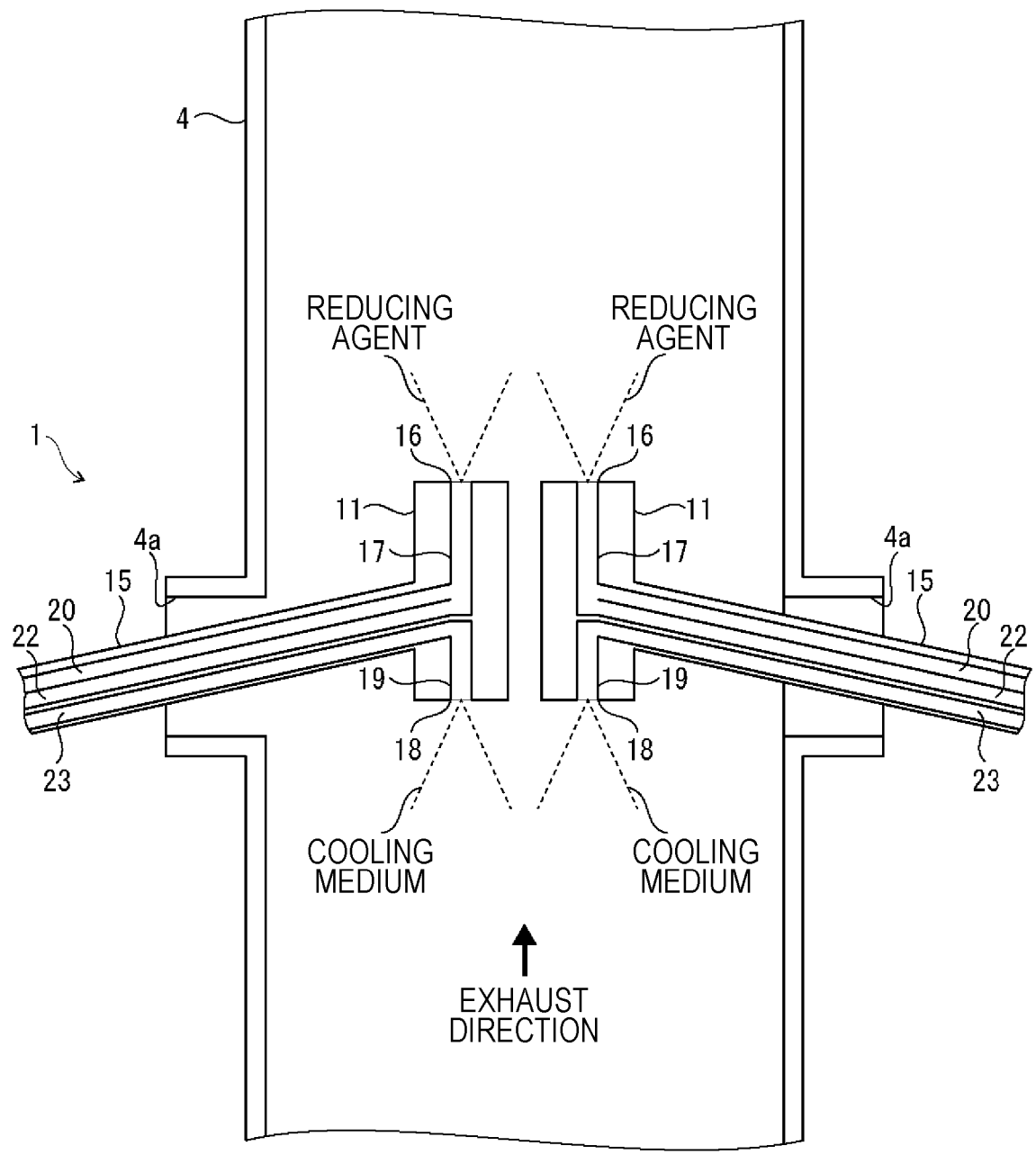
FIG. 5 is a schematic diagram illustrating another example of an injection nozzle in an exhaust gas purification device according to an embodiment of the present invention.

In the present embodiment, an example where the exhaust gas purification device 1 includes one injection nozzle 11 for one exhaust pipe 4 has been described. However, the present invention is not limited to this example. As another example, the exhaust gas purification device 1 may include two or more injection nozzles 11 for one exhaust pipe 4 in accordance with the size of the engine 2. For example, in the large engine 2 of the large ship or medium-sized ship, as illustrated in FIG. 5, two injection nozzles 11 may be provided for one exhaust pipe 4.

In the present embodiment, an example where one injection nozzle 11 is provided for one exhaust pipe 4 and is arranged at the radial center of the exhaust pipe 4 has been described. However, the present invention is not limited to this example. As another example, in a case where two or more injection nozzles 11 are arranged for one exhaust pipe 4 in the exhaust gas purification device 1, the injection nozzles 11 may be equally arranged near the radial center of the exhaust pipe 4 so as to uniformly inject the reducing agent into the exhaust pipe 4.

In the present embodiment, an example where the injection nozzle 11 has one injection hole 16 has been described. However, the present invention is not limited to this example, and, as another example, the injection nozzle 11 may have two or more injection holes 16.

In the present embodiment, an example where the injection nozzle 11 has one discharge hole 18 has been described. However, the present invention is not limited to this example, and, as another example, the injection nozzle 11 may have two or more discharge holes 18. As another example, the injection nozzle 11 may have not only the discharge hole 18 opened in the same direction as the exhaust direction on a surface in the direction opposite to the exhaust direction of the injection nozzle 11, but also one or more discharge holes 18 opened in a direction intersecting with the exhaust direction on an outer peripheral surface (side surface) of the injection nozzle 11. Alternatively, as another example, the injection nozzle 11 may have only the discharge hole 18 opened in the direction intersecting with the exhaust direction on the outer peripheral surface (side surface) of the injection nozzle 11 as long as the injection nozzle 11 can discharge the cooling medium in the direction opposite to the exhaust direction.

In the present embodiment, an example where the exhaust gas purification device 1 is applied to the engine 2 of the ship 100 has been described. However, the present invention is not limited to this example, and the exhaust gas purification device 1 may be applied not only to the engine 2 of the ship 100 but also to a land engine 2.

The present invention can be appropriately modified without departing from the gist or idea of the invention that can be read from the claims and the entire specification, and an exhaust gas purification device having such modification is also included in the technical idea of the present invention.

LIST OF REFERENCE SIGNS

1 Exhaust gas purification device
2 Engine
3 Intake pipe (intake passage)
4 Exhaust pipe (exhaust passage)
5 Supercharger
6 Supercharging pipe (supercharging passage)
9 Intercooler
10 Catalyst reactor
11 Injection nozzle
14 Catalyst
15 Support member
16 Injection hole
18 Discharge hole
20 Reducing agent supply pipe (reducing agent supply passage)
23 Connection pipe (connection passage)
25 Pressure regulating valve (adjusting mechanism)
100 Ship
101 Hull

The invention claimed is:

1. An exhaust gas purification device for purifying nitrogen oxides of exhaust gas, the exhaust gas purification device comprising:
a catalyst that is provided in an exhaust passage that is configured to allow an exhaust gas discharged from an engine to flow in a predetermined exhaust direction and promote reduction of the exhaust gas; and
an injection nozzle that is provided in the exhaust passage upstream from the catalyst in the predetermined exhaust direction and is configured to inject a reducing agent for reducing the exhaust gas,
wherein the injection nozzle has:
an injection hole configured to enable injection of the reducing agent toward the catalyst and at a first point in the exhaust passage, and
a discharge hole configured to enable discharge of a cooling medium at least in a direction opposite to the predetermined exhaust direction and at a second point in the exhaust passage upstream from the first point in the predetermined exhaust direction.

2. The exhaust gas purification device according to claim 1, wherein the injection nozzle is configured to discharge a whole quantity of the cooling medium from the discharge hole.

3. The exhaust gas purification device according to claim 1, further comprising:
a support member disposed through a wall of the exhaust passage so as to extend into an inside of the exhaust passage, and
wherein the injection nozzle is attached to an end of the support member disposed inside the exhaust passage and is configured to inject the reducing agent from the injection hole along the predetermined exhaust direction.

4. The exhaust gas purification device according to claim 3, wherein the support member is oriented at an angle other than 90° to the wall of the exhaust passage through which the support member is disposed.

5. The exhaust gas purification device according to claim 4, wherein the angle is such that a portion of the support member disposed inside the exhaust passage is further along in the predetermined exhaust direction than a portion of the support member exterior to the exhaust passage.

6. The exhaust gas purification device according to claim 1, further comprising:
a connection passage that branches from a supercharging passage through which boosted air boosted by a supercharger is supplied to the engine, and
wherein the injection nozzle is connected to the supercharging passage via the connection passage and is configured to inject, as the cooling medium, the boosted air flowing through the connection passage from the supercharging passage.

7. The exhaust gas purification device according to claim 6, wherein the connection passage branches from the supercharging passage downstream from an intercooler provided in the supercharging passage in an air supply direction of the boosted air in the supercharging passage.

8. The exhaust gas purification device according to claim 6, further comprising:
a pressure regulating valve that is configured to adjust a flow rate of the boosted air passing through the connection passage to less than or equal to a predetermined adjustment amount.

9. The exhaust gas purification device according to claim 1, wherein the injection nozzle is configured such that the injection hole and the discharge hole are arranged at a same position in a radial direction of the exhaust passage.

10. The exhaust gas purification device according to claim 1, wherein the exhaust gas purification device is coupled to the engine installed in a hull.

11. An engine comprising:
the exhaust gas purification device according to claim 1.

12. The exhaust gas purification device according to claim 1, wherein the injection nozzle is a single component that includes the injection hole and the discharge hole.

13. A method of purifying nitrogen oxides of exhaust gas, the method comprising:
providing a catalyst in an exhaust passage, wherein the catalyst is configured to promote reduction of an exhaust gas flowing in a predetermined exhaust direction through the exhaust passage;
injecting, via an injection hole of an injection nozzle, a reducing agent into the exhaust passage toward the catalyst, wherein the reducing agent is injected at a first position in the exhaust passage that is upstream the catalyst in the predetermined exhaust direction;
injecting, via a discharge hole of the injection nozzle, a cooling medium into the exhaust passage in a direction opposite to the predetermined exhaust direction and at a second position in the exhaust passage that is upstream the first position in the predetermined exhaust direction.

14. The method according to claim 13, wherein the cooling medium is boosted air boosted by a supercharger.

15. The method according to claim 14, further comprising directing the boosted air from the supercharger to the discharge hole of the injection nozzle via a connection passage that branches from a supercharging passage through which boosted air from the supercharger is directed to an engine.

16. The method according to claim 15, wherein the connection passage branches from the supercharging passage downstream from an intercooler provided in the supercharging passage in an air supply direction of the boosted air in the supercharging passage.

17. The method according to claim 13, wherein the injection nozzle is a single component that includes the injection hole and the discharge hole.

* * * * *